(12) United States Patent
Yamaguchi et al.

(10) Patent No.: US 7,957,730 B2
(45) Date of Patent: Jun. 7, 2011

(54) SYSTEM AND METHOD FOR ESTIMATING WEIGHTING PARAMETERS FOR ANTENNA ELEMENTS

(75) Inventors: Ryo Yamaguchi, Miura-gun (JP); Shin Nakamatsu, Yokosuka (JP); Shinji Uebayashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 47 days.

(21) Appl. No.: 10/983,739

(22) Filed: Nov. 9, 2004

(65) Prior Publication Data

US 2005/0101315 A1 May 12, 2005

(30) Foreign Application Priority Data

Nov. 12, 2003 (JP) .................................. 2003-382887
Jan. 14, 2004 (JP) .................................. 2004-006806

(51) Int. Cl.
*H04M 1/66* (2006.01)
(52) U.S. Cl. ...... 455/423; 455/25; 455/63.4; 455/562.1; 455/456.4; 455/457; 455/447; 455/41.2; 370/338
(58) Field of Classification Search ................. 455/63.4, 455/25, 562.1, 456.4, 457, 447, 41.2, 423
See application file for complete search history.

(56) References Cited

U.S. PATENT DOCUMENTS

| | | | | |
|---|---|---|---|---|
| 6,421,004 B2 * | 7/2002 | Walley et al. | | 342/360 |
| 6,470,194 B1 * | 10/2002 | Miya et al. | | 455/562.1 |
| 6,765,529 B2 * | 7/2004 | Doi et al. | | 342/368 |
| 6,826,386 B2 * | 11/2004 | Doi | | 455/25 |
| 7,103,386 B2 * | 9/2006 | Hoffmann et al. | | 455/562.1 |
| 2002/0082016 A1 * | 6/2002 | Obayashi | | 455/436 |
| 2005/0030226 A1 * | 2/2005 | Miyamoto et al. | | 342/370 |
| 2005/0075139 A1 * | 4/2005 | Shapira | | 455/562.1 |
| 2005/0085223 A1 * | 4/2005 | Liu | | 455/423 |
| 2006/0079289 A1 * | 4/2006 | Lewis | | 455/562.1 |

OTHER PUBLICATIONS

Tomoaki Nishikido, et al., "An Antenna System with Two Parallel Elements and a Dividing Feed Circuit for a Handy Phone", IEICE Society Conference B-1-190, 2003.

Ryo Yamaguchi, et al., "Improvement of Radiation Efficiency for Mobile Handsets by using Distributed Feed", IEICE Society Conference B-4-4, IEICE Technical Report, 2003.

* cited by examiner

*Primary Examiner* — Nghi H Ly
*Assistant Examiner* — Amancio Gonzalez
(74) *Attorney, Agent, or Firm* — Oblon, Spivak, McClelland, Maier & Neustadt, L.L.P.

(57) ABSTRACT

A weighting parameter estimation system for estimating a weight parameter for the antenna elements of a mobile terminal is provided. The system includes a prohibited space forming part to which electromagnetic waves should not be directed when the mobile terminal transmits a signal in wireless communications, and a weighting parameter determination unit configured to determine the weighting parameter for each of the antenna elements of the mobile terminal such that the power level of a test wave transmitted from or received in the prohibited space becomes the minimum.

10 Claims, 13 Drawing Sheets

DISTRIBUTION IN θ DIRECTION

DISTRIBUTION IN φ DIRECTION

PHASE SPACE DISTRIBUTION

AMPLITUDE SPACE DISTRIBUTION

SYSTEM AND METHOD FOR ESTIMATING WEIGHTING PARAMETERS FOR ANTENNA ELEMENTS

FIELD OF THE INVENTION

The present invention generally relates to a mobile communications technique, and more particularly, to a system and a method for estimating weighting parameters for multiple transmission antenna elements provided to a mobile terminal.

BACKGROUND OF THE INVENTION

In designing mobile terminals, such as mobile phones or cellular phones, improvement of the transmission efficiency of wireless communications is one of the points of greatest concern. A portion of the transmit power is lost due to human bodies located near the mobile terminal, and therefore, the transmission efficiency is reduced. Not only human bodies, but also arbitrary objects and articles that can prevent propagation of radio waves cause the transmission efficiency to decrease.

It is known that the transmission efficiency can be improved by simultaneously feeding power to multiple antenna elements whose amplitudes and phases are appropriately adjusted so as to control the directivity of the radio wave to be transmitted. A combination of the relative amplitude ratio and the phase difference between antenna elements is referred to as "weighting" or "feed weighting". Such a technique is disclosed in, for example, Nishikido, et al., "Parallel 2-element Distributed Feed Antenna for Portable Wireless Equipment", IEICE Society Conference B-1-190, 2003, and Yamaguchi and Uebayashi, "Improvement of Efficiency of Mobile Handsets by Distributed Feed", IEICE Society Conference B-4-4, 2003.

In the conventional method for determining a weighting parameter, an initial weighting parameter (representing a combination of a relative amplitude ratio and a phase difference) is given to each of the antenna elements of a mobile terminal. Then, a radio wave is transmitted using all of the antenna elements, and the radiation efficiency is calculated and/or measured. Then, the weighting parameter for each of the antenna elements is updated based on the obtained radiation efficiency, a radio wave is transmitted again from all of the antenna elements, and the radiation efficiency (SAR) is calculated and/or measured. Subsequently, the radiation efficiency is calculated and/or measured for all the combinations of amplitude ratio and phase difference. The optimum set of weighting parameters that gives the optimum radiation efficiency is selected for the antenna elements of the mobile terminal.

However, to determine weighting parameters using the conventional method, the phase and the amplitude have to be changed successively, and the radiation efficiency has to be calculated and/or measured each time the weighting parameter is updated so as to cover all the possible combinations. This method can hardly be said to be an efficient method because the effort and labor required in calculation and measurement are considerably large. In general, it is advantageous to increase the number of antenna elements from the viewpoint of improvement of the directivity. However, as the number of antenna elements increases, the workload for computation greatly increases, and the weighting parameters cannot be determined quickly. For example, assuming that there are ten values of amplitude ratio between two antenna elements, ranging from 0.1 to 1.0 at stepsize of 0.1, and that there are 360 values of phase difference, ranging from 0 degrees to 360 degrees at stepsize of 1 degree, then there are 3600 combinations (i.e., the possible weighting parameters) for only two antenna elements. If three antenna elements are used, the number of weighting parameter becomes 3600× 3600. For N antenna elements, there are $3600^{(N-1)}$ combinations. The computational workload increases in proportion to the power of (N−1).

SUMMARY OF THE INVENTION

Therefore, it is an object of the present invention to solve at least one of the problems in the conventional techniques and to provide an apparatus and method that can determine weighting parameters for the antenna elements of a mobile terminal in an efficient manner.

To achieve the objects, in one aspect of the invention, a weighting parameter estimation system for estimating a weighting parameter for each of the antenna elements of a mobile terminal is provided. The weighting parameter estimation system includes:

(a) a prohibited space forming part to which electromagnetic wave should not be directed when the mobile terminal transmits a signal in wireless communications; and (b) a weighting parameter determination unit configured to determine a weighting parameter for each of the antenna elements of the mobile terminal such that a power level of a test wave transmitted from or received in the prohibited space becomes the minimum.

In a preferred example, the weighting parameter determination unit estimates a probability density distribution of a time-dependent electric field response obtained from the test wave over a prescribed time, and determines the weighting parameter based on the probability density distribution.

In one structural example, a test wave source is placed in the prohibited space to transmit the test wave. In this case, the weighting parameter determination unit determines the weighting parameter such that the power level of the test wave transmitted from the test wave source and received at the antenna elements becomes the minimum.

In another structural example, a probe is placed in the prohibited space to receive the test wave from each of the antenna elements. In this case, the weighting parameter determination unit determines the weighting parameter such that the power level of the test wave transmitted from each of the antenna elements and received at the probe becomes the minimum.

In another aspect of the invention, a weighting parameter estimation method for estimating a weighting parameter for each of antenna elements of a mobile terminal is provided. In this method, a prohibited space to which electromagnetic wave should not be directed when the mobile terminal transmits a signal in wireless communications is defined. A test wave is transmitted to or from the prohibited space. Then, the weighting parameter is estimated for each of the antenna elements of the mobile terminal such that a power level of the test wave transmitted from or received in the prohibited space becomes the minimum.

BRIEF DESCRIPTION OF THE DRAWINGS

Other objects, features, and advantages of the invention will become more apparent from the following detailed description when read in conjunction with the accompanying drawings, in which.

DETAILED DESCRIPTION OF THE PREFERRED EMBODIMENT

The present invention is described in detail below in conjunction with the attached drawings.

Figure 1:
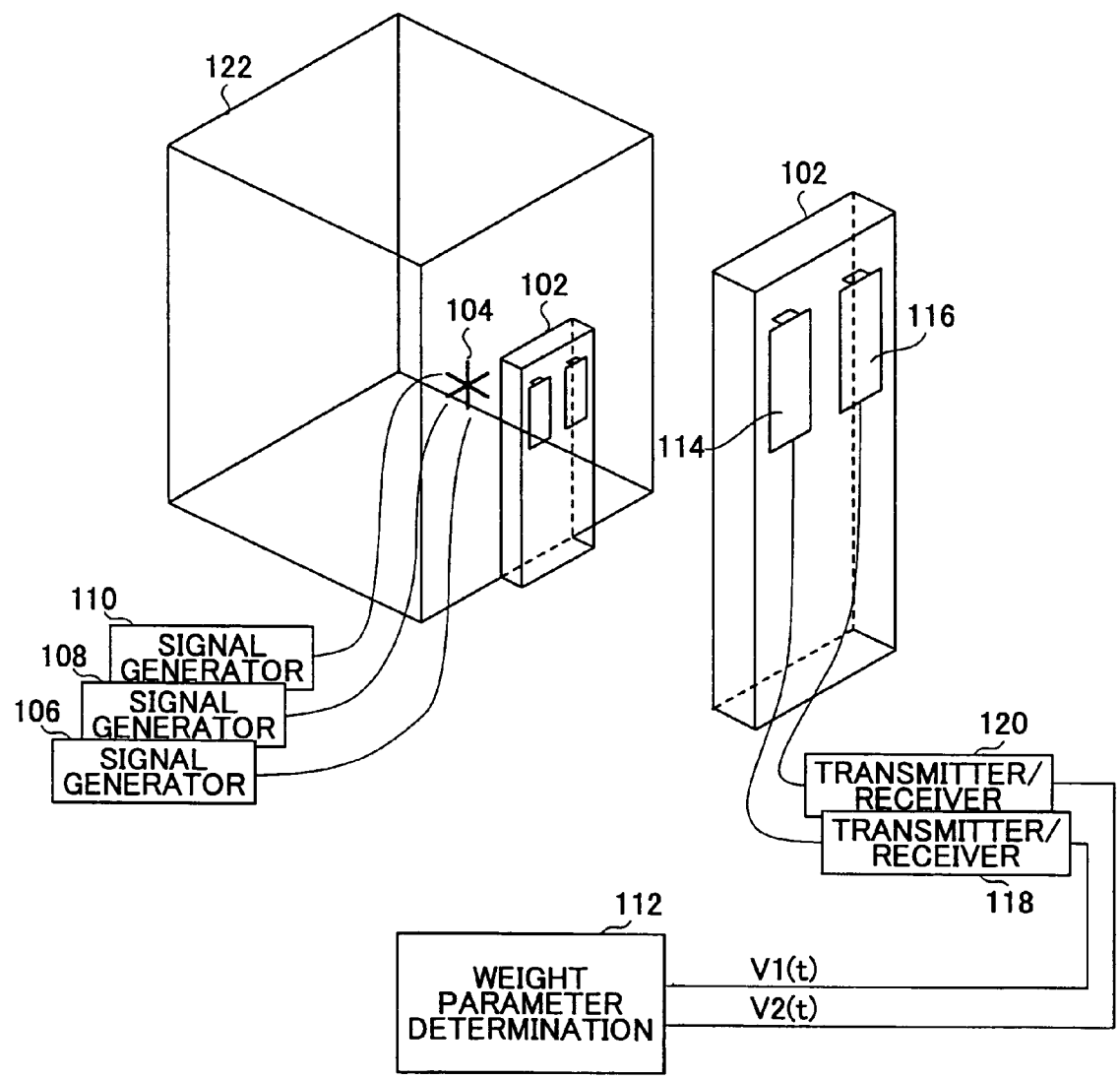
FIG. 1 is a schematic diagram illustrating a weighting parameter estimation system according to the first embodiment of the invention.

FIG. 1 is a schematic diagram illustrating a weighting parameter (hereinafter, referred to as "weight parameter" in the embodiments) estimation system according to the first embodiment of the invention. The system includes a mobile phone handset 102, a test antenna 104 for radiating a test wave, signal generators 106, 108 and 110, and a weight parameter determination unit 112. The mobile phone handset 102 is furnished with antenna elements 114 and 116, which antenna elements are connected to the transmitters/receivers 118 and 120, respectively.

In this system, a pseudobody phantom facility 122 is used, in which the test antenna 104 is placed.

The mobile phone handset 102 has two antenna elements 114 and 116 in this example for simplification, for which weight parameters are to be determined by the weight parameter estimation system. However, three or more antenna elements may be provided.

Figure 2:
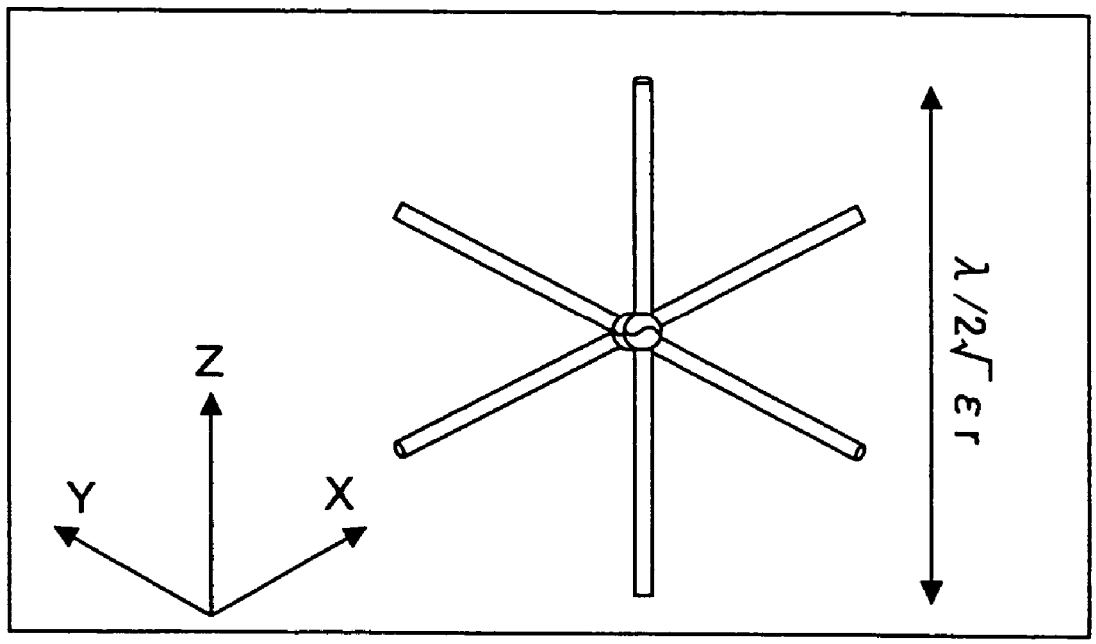
FIG. 2 is a schematic diagram illustrating an example of triaxial test antenna used as a part of the test wave source for radiating test wave in the system shown in FIG. 1.

FIG. 2 is a schematic diagram of the test antenna 104 used in the weight parameter estimation system shown in FIG. 1. The test antenna 104 is a triaxial dipole antenna in this example, and it outputs radio waves polarized in arbitrary directions. The triaxial dipole antenna is a combination of three dipole antennas assembled so as to be at right angles to each other, each dipole antenna transmitting a radio wave polarized in the direction of a certain axis. In FIG. 2, the size of the test antenna is $\lambda/2*(\epsilon r)^{1/2}$, where $\lambda$ is the wavelength of the transmitted test wave and $\epsilon r$ is the relative permittivity of the phantom facility 122. The wavelength $\lambda$ of the test wave to be transmitted is set shorter than or equal to the wavelength used in the mobile phone handset 102.

Returning to FIG. 1, the signal generators 106, 108 and 110 are connected to the respective dipole antenna elements of the test antenna 104, and they operate so as to excite the antenna 104 in each of the axial directions. The signal generators 106, 108 and 110 and the test antenna 104 form a test wave source. This test wave source is a random wave source that radiates test waves such that the radiated wave is polarized in a certain direction instantaneously, but is isotropic if averaged over time.

Figure 3A:
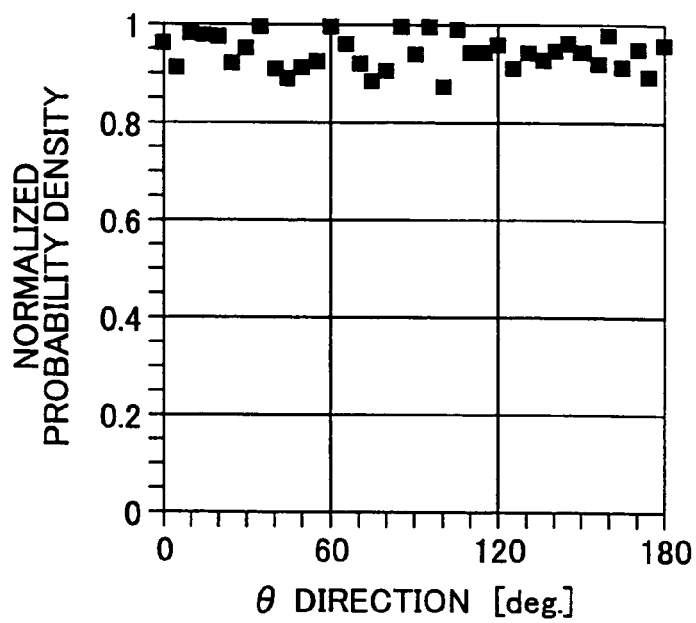
FIG. 3A and FIG. 3B are graphs showing polarized wave characteristics of the test wave source used in the embodiment.
Figure 3B:
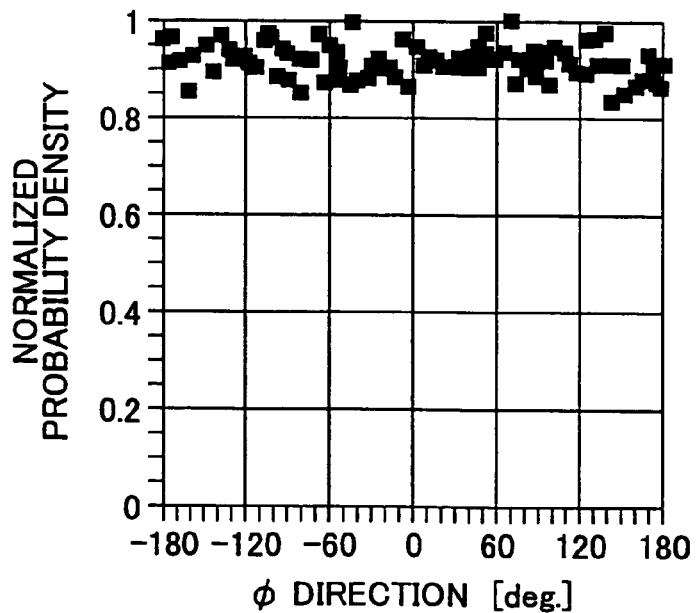

FIG. 3A and FIG. 3B are graphs showing the characteristics of the polarized wave. FIG. 3A shows the normalized probability density distribution in the θ direction, and FIG. 3B shows the normalized probability density distribution in the φ direction. The radiated test wave is polarized in ascending vertical angle θ and azimuthal angle φ at a certain moment. However, because the test wave is generated a huge number of times (80,000 times, for example) per unit time while changing the polarized direction at random, the probability density distribution of the polarized direction turns out to be isotropic. As illustrated in FIG. 3A and FIG. 3B, the polarized direction is distributed uniformly over the entire ranges in the θ and φ directions. In other words, the test antenna 104 with 3 degrees of freedom in polarized direction is employed so as to sequentially generate test waves whose polarized direction varies every moment randomly.

Returning again to FIG. 1, the antenna elements 114 and 116 of the mobile phone handset receive the test wave transmitted from the test antenna 104. The signals received at the antenna elements 114 and 116 are processed at the transmitters/receivers 118 and 120, respectively, and then supplied to the weight parameter determination unit 112. To this end, the transmitters/receivers 118 and 120 function as signal processors.

The weight parameter determination unit 112 determines weight parameters (combinations of relative amplitude ratio and phase difference).

The pseudobody phantom facility 122 is a loss-inducing medium that represents, for example, a human head. In the first embodiment, the pseudobody phantom facility 122 is a cube 20 cm on a side; however, it may take any shape. The relative permittivity $\epsilon r$ of the pseudobody phantom facility 122 is 41 in this example, and the electric conductivity σ is 1.3 S/m. The pseudobody phantom facility 122 defines a prohibited space to which electromagnetic radiation should not be directed when the mobile phone handset 102 transmits signals. An approach for reducing power loss in this prohibited space is made using a technique described below. In addition, if an electronics device that has to be protected from electromagnetic interference is located in the prohibited space, adverse influence on the electronic device has to be reduced as much as possible.

Figure 4:
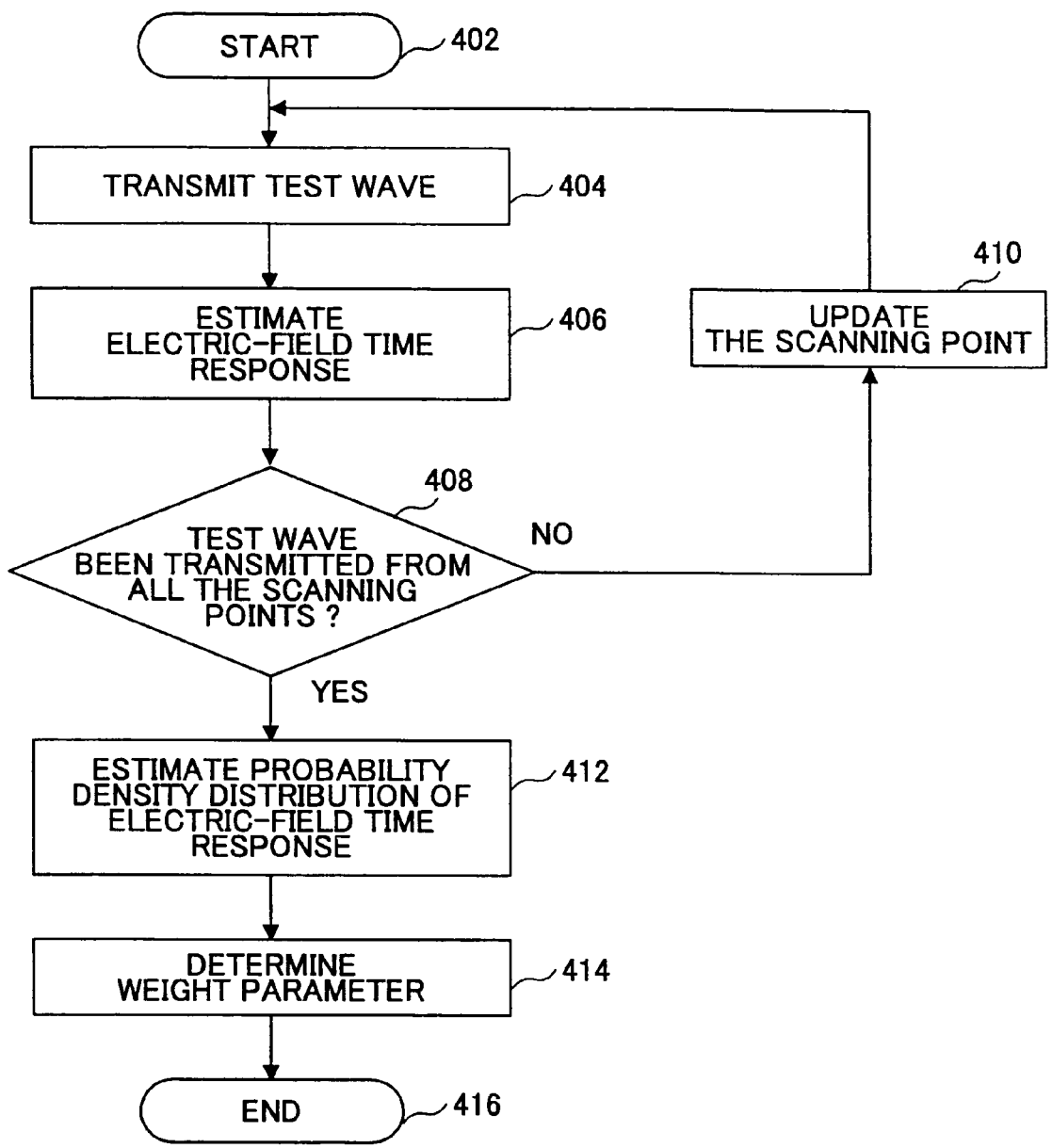
FIG. 4 is a flowchart showing the operation of determining weighting parameters for the antenna elements of the mobile phone handset according to the first embodiment of the invention.

FIG. 4 is a flowchart showing the operation of determining weight parameters for the antenna elements of the mobile phone handset 102. The process starts in step S402, and a test wave is transmitted in step S404. The test wave is transmitted from the test antenna 104 located at an initial position in the pseudobody phantom 122. As has been described above, the test wave is a randomly changing polarized wave. The test wave is received at each of the antenna elements 114 and 116 of the mobile phone handset 102. After the signal processing at transmitters/receivers 118 and 120, the processed signals are supplied as signals V1(*t*) and V2(*t*) to the weight parameter determination unit 112. The processed signals V1(*t*) and V2(*t*) represent electric field responses at time t (which vary as a function of time) at the respective antenna elements 114 and 116. The time-dependent electric field response is referred to as "electric-field time response".

In step S406, electric-field time responses V1(*t*) and V2(*t*) of the antenna elements 114 and 116 are estimated in step S406. The electric-field time responses may be estimated by experiment, or calculated from equation (1).

$$V1(t) = E_{1x} \cdot n_x(t) + E_{1y} \cdot n_y(t) + E_{1z} \cdot n_z(t)$$

$$V2(t) = E_{2x} \cdot n_x(t) + E_{2y} \cdot n_y(t) + E_{2z} \cdot n_z(t) \quad (1)$$

where $n_x(t)$, $n_y(t)$, and $n_z(t)$ are coordinate components of band-limited white noise vector n(t); $E_{1x}$, $E_{1y}$, and $E_{1z}$ are the components of the electric field response for the first antenna element 114; and $E_{2x}$, $E_{2y}$, and $E_{2z}$ are the components of the electric field response for the second antenna element 116. If these parameters are known in advance, the electric-field time responses can be obtained through computation, without conducting experiments. The electric field response and its components (such as $E_{1x}$, $E_{1y}$, and $E_{1z}$) are stationary parameters independent of time, and referred to as "stationary electric field response" as necessary.

In step S408, it is determined whether the test wave has been transmitted from all the scanning points within the pseudobody phantom facility 122. If NO in step S408, the scanning point is updated to the next scanning point in step S410, and then, the process returns to step S404, in which a test wave is transmitted from the new point. Steps S404 through S408 are repeated until the electric-field time responses are estimated at all the points. When all the scanning points have been processed, the process proceeds to step S412.

In step S412, the probability density distribution is estimated for the electric-field time response obtained in step S406. Based on the electric-field time response of each antenna element, the probability density distributions of the relative amplitude ratio and the phase difference of the electromagnetic wave received at each antenna element are estimated over a certain period of time.

In step S414, a combination of relative amplitude and phase difference (i.e., a weight parameter) is selected for each antenna element, while estimating the probability density distributions, such that the electromagnetic radiation received at each antenna element becomes the minimum. In estimating the weight parameter, a covariance matrix R is calculated first based on electric-field time responses V1(*t*) and V2(*t*). Matrix element $R_{ij}$ of the covariance matrix R is represented as a summation of the product of Vi(t) and the complex conjugate of Vj(t) summed up over a certain period of time.

$$Rij = \Sigma Vi(t) \cdot Vj(t)^* \quad (2)$$

where the asterisk superscript signifies the complex conjugate. Using the covariance matrix, a weight parameter is estimated such that the power level of the signal received at the antenna element becomes the minimum. In more general terms, an adaptive algorithm describing the above-explained steps is executed to obtain a desired set of weight parameters that can minimize the power level of the test wave at the receiving end. Examples of the adaptive algorithm include the power inversion (PI) method.

When the weight parameters are estimated for the antenna elements 114 and 116, the process terminates in step S416. The selected weight parameters are set in the antenna elements 114 and 116 of the mobile phone handset 102, and consequently, the radio wave to be transmitted from the mobile phone handset 102 is prevented from being directed to the prohibited space (that is, toward the human head).

As has been described, in the first embodiment, the weight parameters are selected for the antenna elements 114 and 116 of the mobile phone handset 102 such that the power level of the test wave transmitted from the test antenna 102 placed in the pseudobody phantom facility 122 becomes the smallest at the antenna elements 114 and 116. When transmitting radio signals by feeding the antenna elements 114 and 116 of the mobile phone handset 102 using the selected setting of the weight parameters, propagation loss due to the pseudobody phantom facility 122 is minimized. This is because of the reversibility of signal transmission/receipt. Minimizing the electromagnetic radiation from the test antenna 104 at the mobile phone handset 102 means that the radio wave transmitted at the same frequency from the mobile phone handset 102 toward the test antenna 104 is also minimized.

In the first embodiment, steps S404 through S410 are repeated by shifting the position of the test antenna 104 so as to cover all the scanning points, and electric-field time response is calculated at each scanning point. A weight parameter for each antenna element is determined through estimation of the probability density distribution of the electric-field time responses (steps S412 and 414). The number of scanning points may increase along with the number of the antenna elements; however, such increase is not exponential, unlike the conventional method in which the arithmetic workload is raised exponentially depending on the number of antenna elements.

The weight parameters can be estimated for three or more antenna elements, although in the first embodiment only two antenna elements are used for simplification.

Figure 5A:
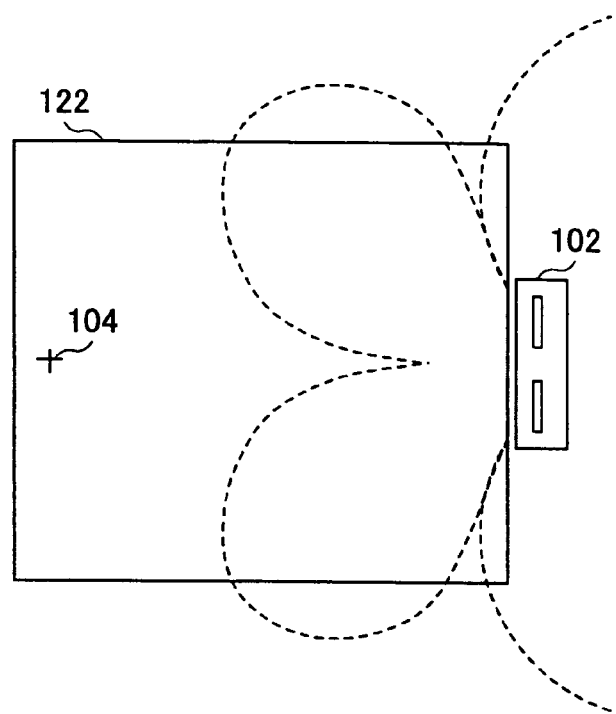
FIG. 5A and FIG. 5B illustrate positional relations between the mobile terminal and the test wave source.
Figure 5B:
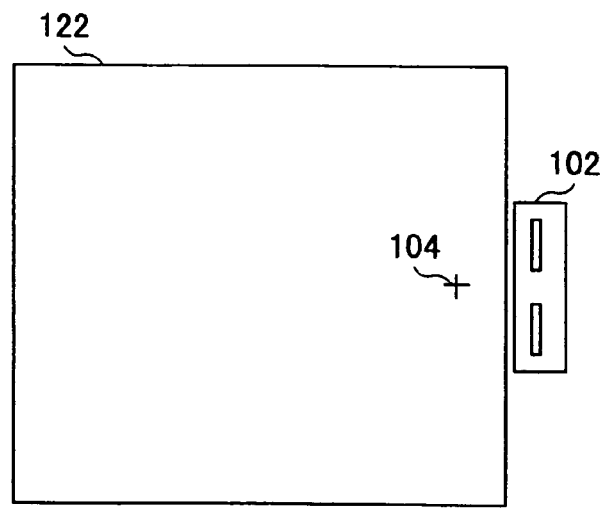

FIG. 5A and FIG. 5B illustrate positional relations between the test antenna 104 and the mobile phone handset 102. In both figures, the test antenna 104 is located within the pseudobody phantom facility 122. While the test antenna 104 is away from the mobile phone handset 102 in FIG. 5A, it is located very close to the mobile phone handset 102 in FIG. 5B. In FIG. 5A, the antenna pattern (that is, the directivity pattern realized by the weight parameters set in the respective antenna elements) illustrated by the dashed line could be created from the viewpoint of simply reducing the power level of the radio wave arriving from the test antenna 104. However, with the antenna pattern depicted in FIG. 5A, power loss due to the close-by pseudobody phantom facility 122 becomes conspicuous, which makes it difficult to improve the transmission efficiency. To avoid this inconvenience, the test antenna 104 is located adequately close to the mobile phone handset 102, as illustrated in FIG. 5B. From the viewpoint of preventing the fall of the transmission efficiency due to pseudobody phantom facility 122, it is desired to place the test antenna 104 in the vicinity of the mobile phone handset 102 (especially, near the antenna elements 114 and 116 thereof).

Figure 6:
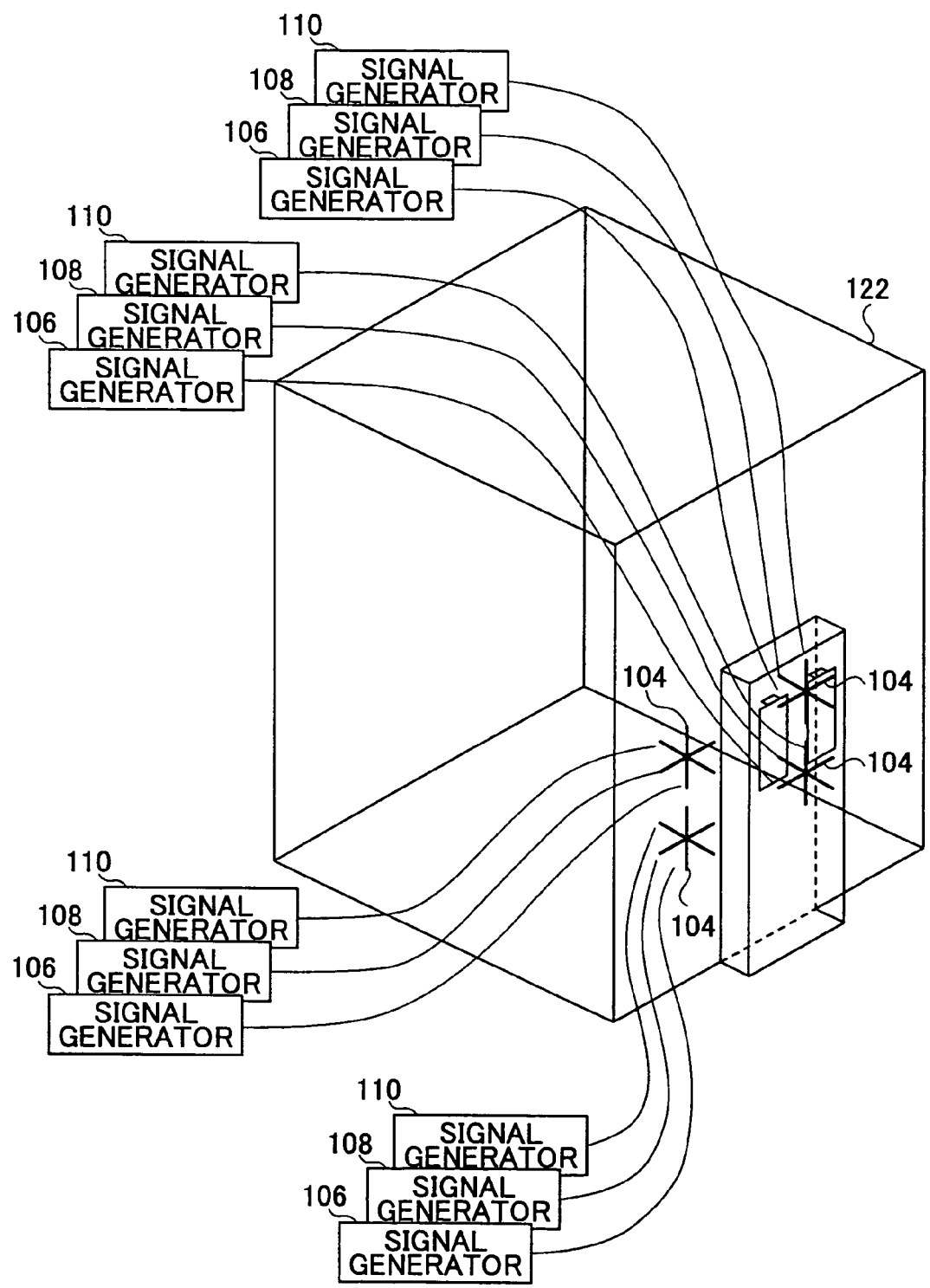
FIG. 6 is a schematic diagram illustrating a modification of the weighting parameter estimation system, in which multiple test antennas are placed in the pseudobody phantom facility.

FIG. 6 illustrates a modification of the weight parameter estimation system of the first embodiment. In this modification, four test wave sources are used. The weight parameter determination unit 112 is not depicted in FIG. 6 for the purpose of simplification of the drawing. As has been described above, the positional relation between the test antenna 104 and the mobile phone handset 102 is an important item in determination of weight parameters. A test wave is transmitted from each of the four test wave sources independently, and weight parameters for the antenna elements 114 and 116 are selected such that all the test waves arriving from the respective sources are reduced sufficiently. This arrangement can further improve the transmission efficiency (by efficiently preventing decrease of radiation efficiency due to the pseudobody phantom facility 122).

The random wave source used in the first embodiment allows the power loss to be reduced efficiently. If a fixed wave source that generates a test wave polarized only in a fixed direction is used, antenna elements 114 and 116 will receive electromagnetic radiation with fixed polarization. In this case, weight parameters are selected so that the fixed-polarization wave received at the antenna elements 114 and 116 becomes the minimum in step S408 of the flowchart shown in FIG. 4. Then, the radio wave to be transmitted from the antenna elements 114 and 116 under the selected weight parameters is also polarized in that fixed direction. Meanwhile, power P to be lost due to the pseudobody phantom is expressed as $$P = \sigma(|Ex|^2 + |Ey|^2 + |Ez|^2)^{1/2} \quad (3)$$

where σ is the electric conductivity, and Ex, Ey, and Ez are orthogonal components of the electric field. With the triaxial test antenna with three orthogonal axes, even if a test wave component polarized in a certain direction is suppressed, the other polarized components may not be controlled, and the entire receive power may not be reduced after all. To avoid this problem, an uncorrelated random wave source is used, and weight parameters are determined so as to minimize the power of all the randomly polarized wave components at the antenna elements.

Figure 7:
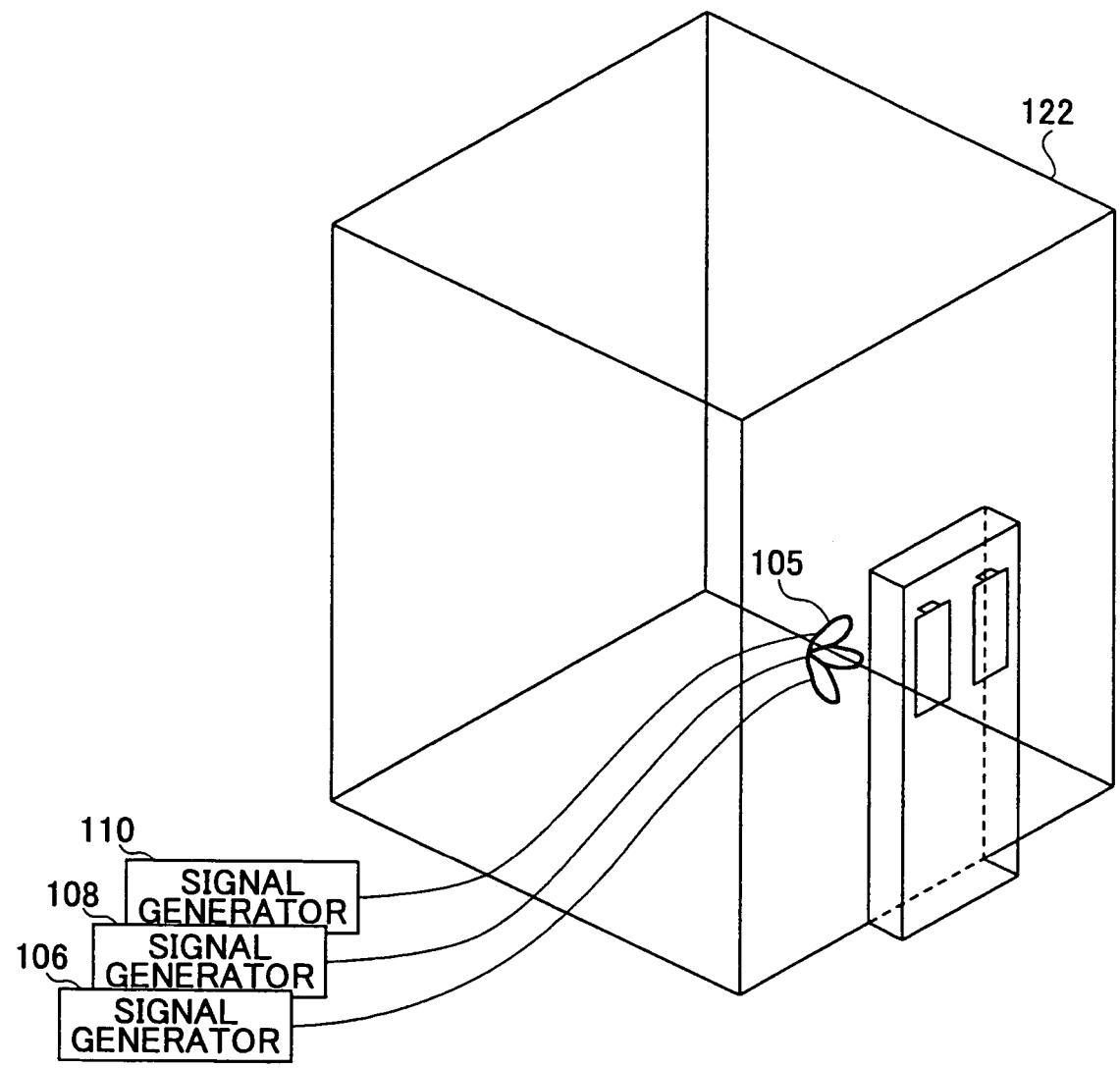
FIG. 7 is a schematic diagram illustrating another modification of the weighting parameter estimation system, in which a loop antenna is used in place of the triaxial dipole antenna.

FIG. 7 illustrates another modification of the weight parameter estimation system of the first embodiment. In this modification, a loop antenna 105 is used as the test antenna, in place of the triaxial dipole antenna 104. Any suitable antenna may be used as the test antenna as long as it functions as a random wave source. From the viewpoint of easiness of impedance matching or manufacturing process, it is desirable to use a loop antenna. From the viewpoint of easiness in analysis in conformity to the level of the electric field, it is desirable to use a dipole antenna. Although not shown in the drawings, the degree of freedom in polarized direction may be reduced, and a two-dimensional antenna may be used if it is unnecessary to pay attention to one of the three axes components. For example, one propagation component along a certain axis may hardly get into the pseudobody phantom facility 122, as compared to the other propagation components along the other axes.

Figure 8:
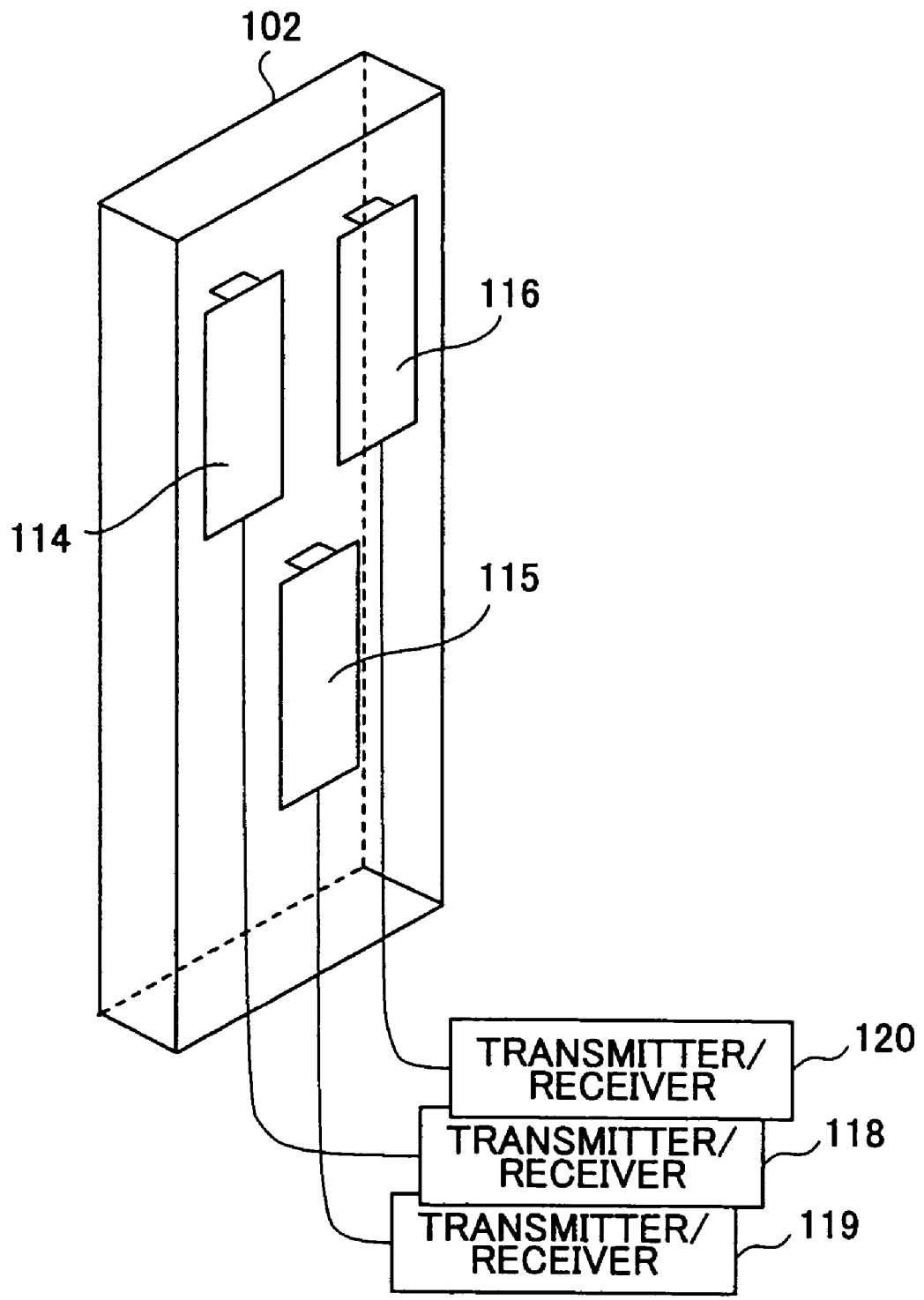
FIG. 8 is a schematic diagram illustrating a modification of the mobile terminal with three antenna elements.

FIG. 8 illustrates a modification of the mobile phone handset 102 of the first embodiment. The mobile phone handset 102 has three antenna elements 114, 115, and 116. The positional relation between the test wave source and mobile phone handset 102 is likely to vary among the antenna elements. In this case, it is advantageous to use multiple test wave sources in the system, as illustrated in FIG. 6.

Figure 9A:
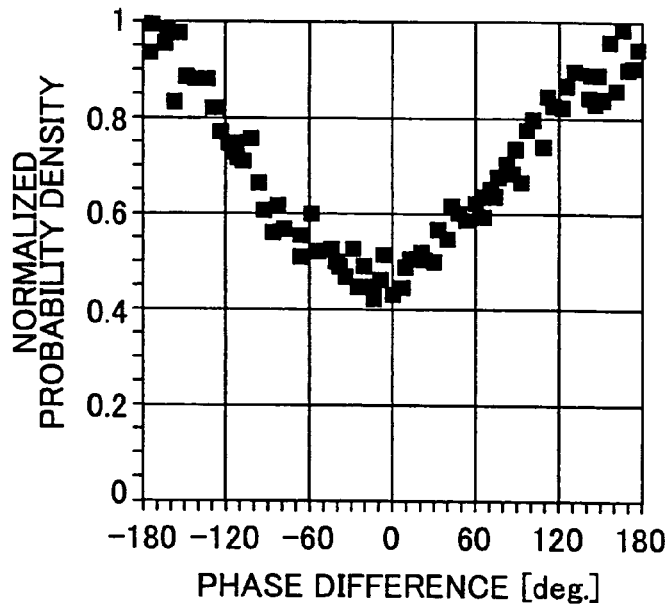
FIG. 9A and FIG. 9B are graphs showing the simulation results of the first embodiment of the invention.
Figure 9B:
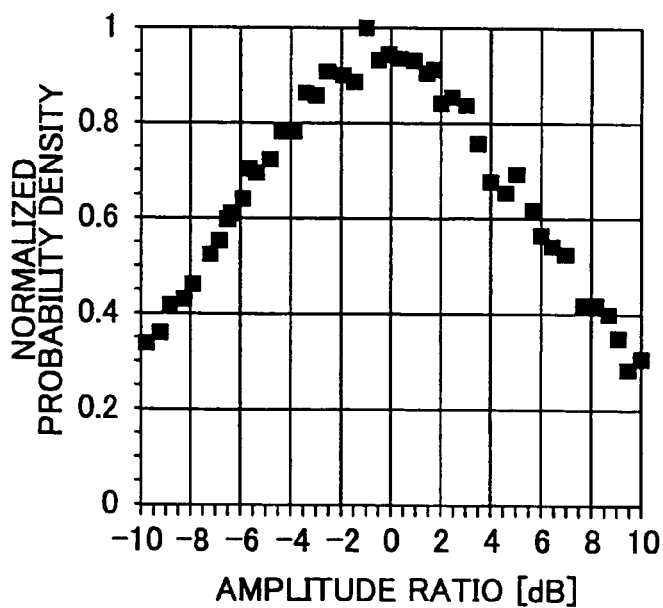

FIG. 9A and FIG. 9B are graphs showing the simulation results of the first embodiment. FIG. 9A plots normalized probability density as a function of phase difference, and FIG. 9B plots normalized probability density as a function of amplitude ratio.

Typical parameters set in the simulation are shown in Table 1.

TABLE 1

| PARAMETER | |
|---|---|
| Frequency | 2 GHz |
| Antenna Shape of Mobile Phone | Inverted "F" antenna |
| # of antenna elements | 2 |
| Shape of Housing | Straight (Linear) Type |
| Position of Mobile Phone | Parallel to Phantom Facility |
| Output power level | 1 W |
| Feed Amplitude | Constant Amplitude |
| Shape of Phantom | Cube |
| Relative Permittivity of Phantom | 41 |
| Electric Conductivity of Phantom | 1.3 S/m |

As the test antenna, a triaxial dipole antenna shown in FIG. 2 is used. Electric field responses $E1=(E_{1x}, E_{1y}, E_{1z})$ and $E2=(E_{2x}, E_{2y}, E_{2z})$ for the respective antenna elements (antenna feeders) of the mobile phone are obtained in the axial directions, and electric-field time responses (or received waveforms) $V1(t)$ and $V2(t)$ are estimated by multiplying the electric field responses by the time-varying random waveform $n(t)=(n_x(t), n_y(t), n_z(t))$.

If the received waveform at each of the antenna feeders is known, the phase difference and the amplitude ratio between the antenna feeders can be obtained. Since the phase difference and the amplitude ratio change as time passes, these parameters are not constant, but are distributed over the possible ranges.

As illustrated in FIG. 9A, the phase difference is distributed from negative 180 degrees to positive 180 degrees. The probability density is high at negative and positive 180 degrees (with two antenna elements being 180-degrees out of phase), and low at zero degrees (with two antenna elements being in-phase).

As illustrated in FIG. 9B, the probability density is high when the amplitude ratio is 1. In order to receive as much test wave power as possible, the antenna elements are to be arranged 180-degrees out of phase, and the amplitude ratio is set to 1. To the contrary, to receive as little test wave power as possible, the two antenna elements are arranged in phase and the amplitude ratio is set to 1.

In the simulation, the radiation efficiency is estimated under the first condition, in which the weight parameters are set such that the antenna elements are 180-degrees out of phase with the amplitude ratio of 1, and the second condition, in which the antenna elements are in phase with the amplitude ratio of 1. The radiation efficiency of the former is only 15.1%, while that of the latter is 57.1%. The same applies to three or more antenna elements. In such a case, appropriate weight parameters can be determined by executing the adaptive algorithm shown in FIG. 4 for minimizing the receive power level at the antenna elements.

In the embodiment, explanation is made assuming that the weight parameters set in the antenna elements are fixed for the purpose of simplification; however, the invention is not limited to this embodiment. The present invention is advantageously applicable to a mobile phone handset with an adaptive array antenna. In this case, the weight parameters for multiple antenna elements are adjusted in an adaptive manner. Under such circumstance that an unfixed prohibited space to which the radio wave should not be directed when transmitting radio signals exists, adaptive control for not directing the radio wave to the prohibited space is still required, in addition to the ordinary adaptive control of directivity toward a desired communication node.

Figure 10:
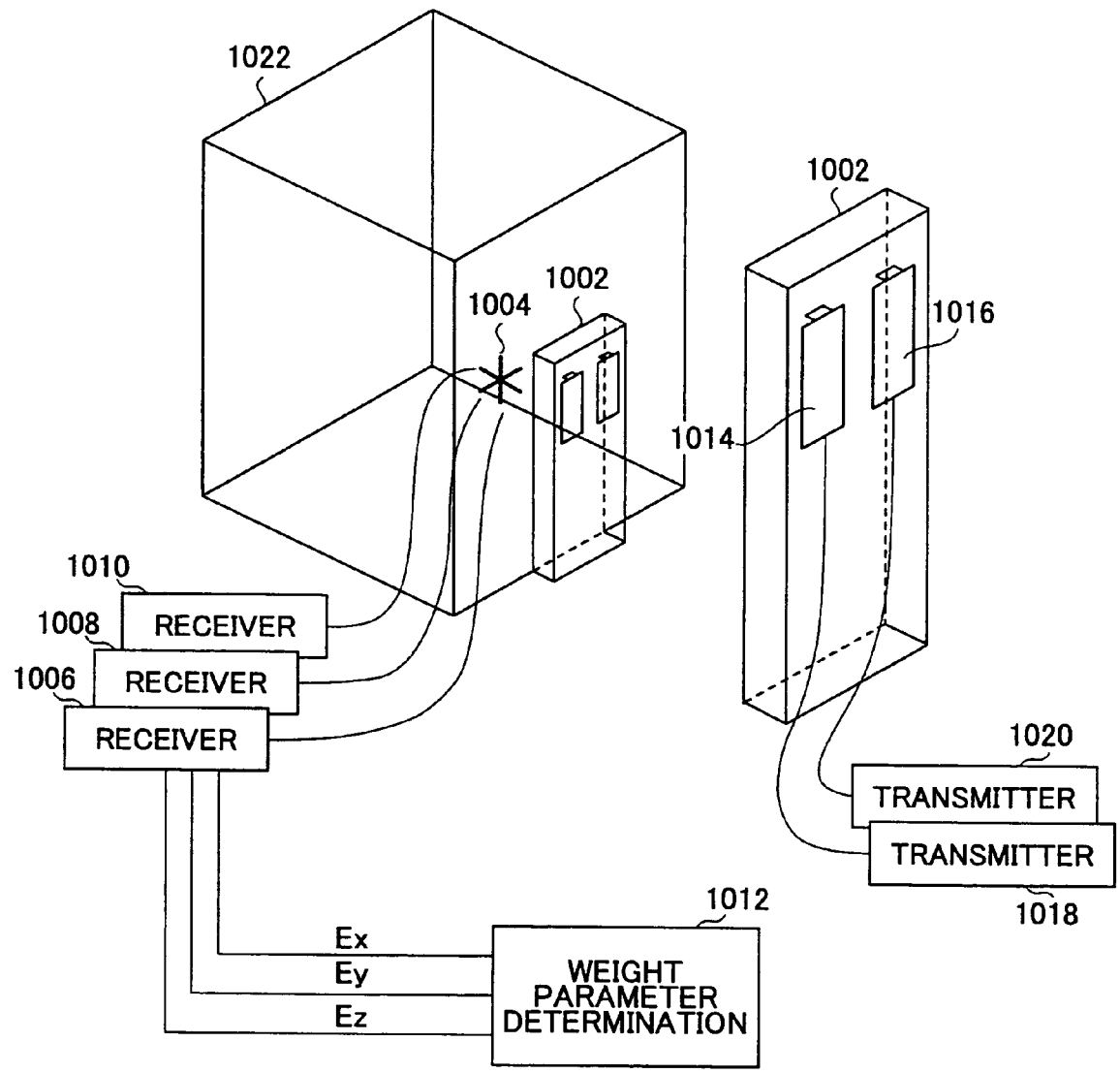
FIG. 10 is a schematic diagram of the weighting parameter estimation system according to the second embodiment of the invention.

FIG. 10 is a schematic diagram of the weight parameter estimation system according the second embodiment of the invention. The weight parameter estimation system of the second embodiment includes a mobile phone handset 1002, a probe 1004, receivers 1006, 1008 and 1010, and a weight parameter determination unit 1012. The mobile phone handset 1002 is furnished with multiple antenna elements 1014 and 1016, and each of the antenna elements 1014 and 1016 is connected to one of the transmitters 1018 and 1020. The probe 1004 is placed in a pseudobody phantom facility 1022.

In the second embodiment, a test wave is transmitted from each of the antenna elements 1014 and 1016 of the mobile phone handset 1002, and weight parameters for these antenna elements are estimated from the test signal received at the probe 1004.

Although, in the second embodiment, only two antenna elements 1014 and 1016 are illustrated for the purpose of simplification, three or more antenna elements may be provided to the mobile phone handset 1002 as necessary. For the sake of convenience, transmitters 1018 and 1020 are connected to the mobile phone handset 1002; however, the mobile phone handset 1002 has both transmitting function and receiving function in actual application.

In the second embodiment, the probe 1004 is set in the pseudobody phantom facility 1022, in place of the test antenna 104. The probe 1004 is a detector element that can receive the test wave (the electric field and/or the magnetic field) transmitted from the mobile phone handset 1002. In the second embodiment, a triaxial probe 1004 with three orthogonal axes (for example, the x, y and z axes) is employed to accurately receive the electric field and/or the magnetic field defined by three-dimensional components. Each of the probe elements of the triaxial probe 1004 is connected to one of the receivers 1006, 1008 and 1010.

The mobile phone handset 1002 transmits a test wave from each of the antenna elements 1014 and 1016, independently from each other. For example, one of the antenna elements (for example, antenna element 1014) transmits a test wave at prescribed amplitude and in a prescribed phase, over a certain period of time. Then, the other antenna element (antenna element 1016) transmits a test wave with the prescribed amplitude and phase over the period of time. Stationary electric field response E (Ex, Ey, Ez) is determined by the receivers 1006, 1008 and 1010 for each of the antenna elements 1014 and 1016, based on the received test waves. To this end, the set of receivers 1006, 1008 and 1010 functions as a signal processor. The stationary electric field response is an electric field response independent of time, which is distinguished from electric-field time response or non-stationary electric field response that changes over time. Each component of the stationary electric field response is supplied from the associated one of receivers 1006, 1008 and 1010 to the weight parameter determination unit 1012, which then estimates electric-field time response.

The weight parameter determination unit 1012 further estimates the probability density distribution of electric-field time response, and determines weight parameters (combinations of relative amplitude ratio and phase difference between antenna elements) for the antenna elements 1014 and 1016 such that the power level of the radio wave transmitted from the antenna elements 1014 and 1016 becomes the minimum. The pseudobody phantom facility 1022 is the same as that used in the first embodiment, and explanation for it is omitted.

Figure 11:
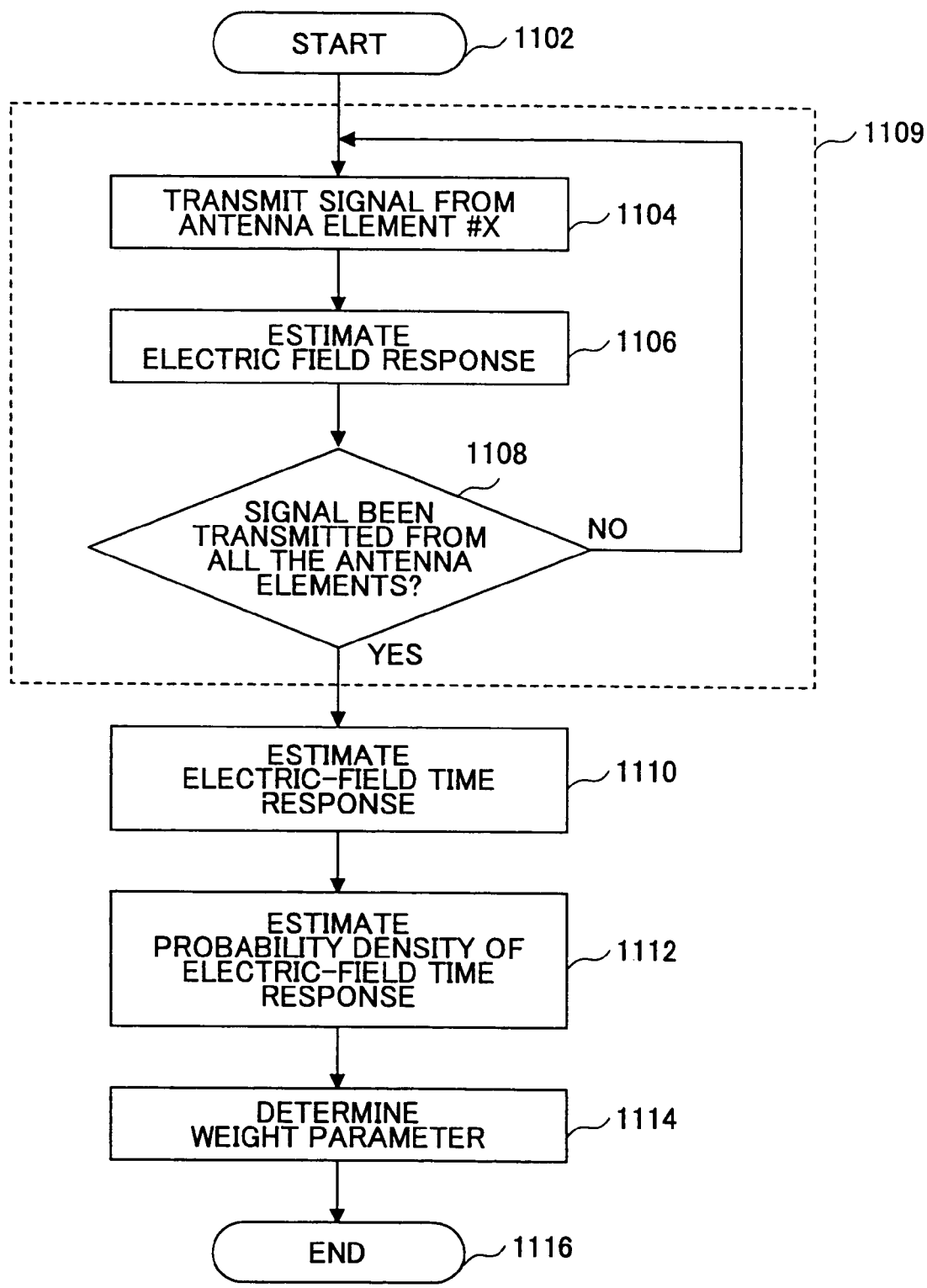
FIG. 11 is a flowchart showing the operation of determining weighting parameters for the antenna elements of the mobile terminal according to the second embodiment of the invention.

FIG. 11 is a flowchart showing the operation carried out by the weight parameter estimation system according to the second embodiment of the invention. The process stars in step S1102.

In step S1104, a test wave (or a test signal) is transmitted at prescribed amplitude and in prescribed phase from one of the antenna elements (for example, antenna elements 1014) of the mobile phone handset 1002. The test wave is received at the triaxial probe 1004 and processed by the receivers 1006, 1008 and 1010. In step S1106, the electric field response is estimated for this antenna element 1014 based on the received signal. The electric field response is a stationary one independent of time, which is expressed as, for example, $E_{1x}=(E_{1x}, E_{1y}, E_{1z})$ for a specific antenna element. The subscript number "1" indicated that this electric field response is for the first antenna element (e.g., the antenna element 1014).

In step S1108, it is determined whether all the antenna elements have transmitted a test wave. If not, the process returns to step S1104, and a test wave is transmitted from another antenna element (for example, antenna element 1106). Then, steps S1106 and S1108 are repeated. If a test wave has been transmitted from all the antenna elements (YES in S1108), the process proceeds to step S1110.

In S1110, electric-field time responses $V1(t)$ and $V2(t)$ of the antenna elements 114 and 116 are estimated as in step S406. The time responses may be estimated by experiment, or calculated from equation (1).

$$V1(t)=E_{1x} \cdot n_x(t)+E_{1y} \cdot n_y(t)+E_{1z} \cdot n_z(t)$$

$$V2(t)=E_{2x} \cdot n_x(t)+E_{2y} \cdot n_y(t)+E_{2z} \cdot n_z(t) \quad (1)$$

where $n_x(t)$, $n_y(t)$, and $n_z(t)$ are coordinate components of band-limited white noise vector $n(t)$; $E_{1x}$, $E_{1y}$, and $E_{1z}$ are the components of the electric field response for the first antenna element 114; and $E_{2x}$, $E_{2y}$, and $E_{2z}$ are the components of the electric field response for the second antenna element 116. Unlike the electric field response and its components (such as $E_{1x}$, $E_{1y}$, and $E_{1z}$) which are independent of time, the amplitude and the phase of the random noise vary at random over time, and therefore, the electric-field time response $V1(t)$ and $V2(t)$ are time-dependent and non-stationary electric field responses.

In step S1112, the probability density distribution is estimated for the electric-field time response obtained in step S1110. To be more precise, based on the electric-field time response of each antenna element, the probability density distributions of the relative amplitude ratio and the phase difference of the electromagnetic wave received at each antenna element are estimated over a certain period of time.

In step S1114, a combination of relative amplitude and phase difference (i.e., a weight parameter) is selected for each antenna element, while estimating the probability density distributions, such that the electromagnetic radiation received at the probe 1004 from the antenna elements 1014 and 1016 becomes the minimum. The weight parameter estimation can be implemented using an adaptive algorithm, such as the power inversion (PI) method or null steering method.

When the weight parameters are estimated for the antenna elements 1014 and 1016, the process terminates in step S1116.

Although in the above-described example two antenna elements 1014 and 1016 are used for the purpose of simplification, weight parameters can be appropriately determined for three or more antenna elements.

In the second embodiment, stationary electric field responses ($E_x$, $E_y$, $E_z$) are obtained at receivers 1006, 1008 and 1010 for each antenna element, based on the radio wave transmitted from a certain antenna element and received at the probe 1004. This process is repeatedly carried out until the radio waves transmitted from all the antenna elements have been processed. Then, non-stationary and time-dependent electric field responses V1(t) and V2(t) are estimated using the stationary electric field response and random noise (by multiplying the stationary electric field by random noise off-line. Finally, weight parameters are estimated based on the probability density distribution of the non-stationary electric field response (i.e., the electric-field time response) so as to make the probability density minimum.

Making use of the reversibility of signal transmission/receipt, weight parameters are determined for the antenna elements 1014 and 1016 such that the radio wave power transmitted from the mobile phone handset 1002 and received at the probe 1004 becomes the minimum. In the second embodiment, steps S1104 through S1108 are repeated as many times as the number of antenna elements at most to estimate stationary electric field response. Estimating electric-field time response from the stationary electric field response is equivalent to moving the test wave source so as to cover all the scanning points to estimate the electric-field time response (steps S402 through S410) in the first embodiment. Thus, with the second embodiment, the amount and time for computation required to estimate the probability density distribution of electric-field time response are reduced, as compared with the first embodiment, and the weight parameter determination becomes more efficient.

Figure 12:
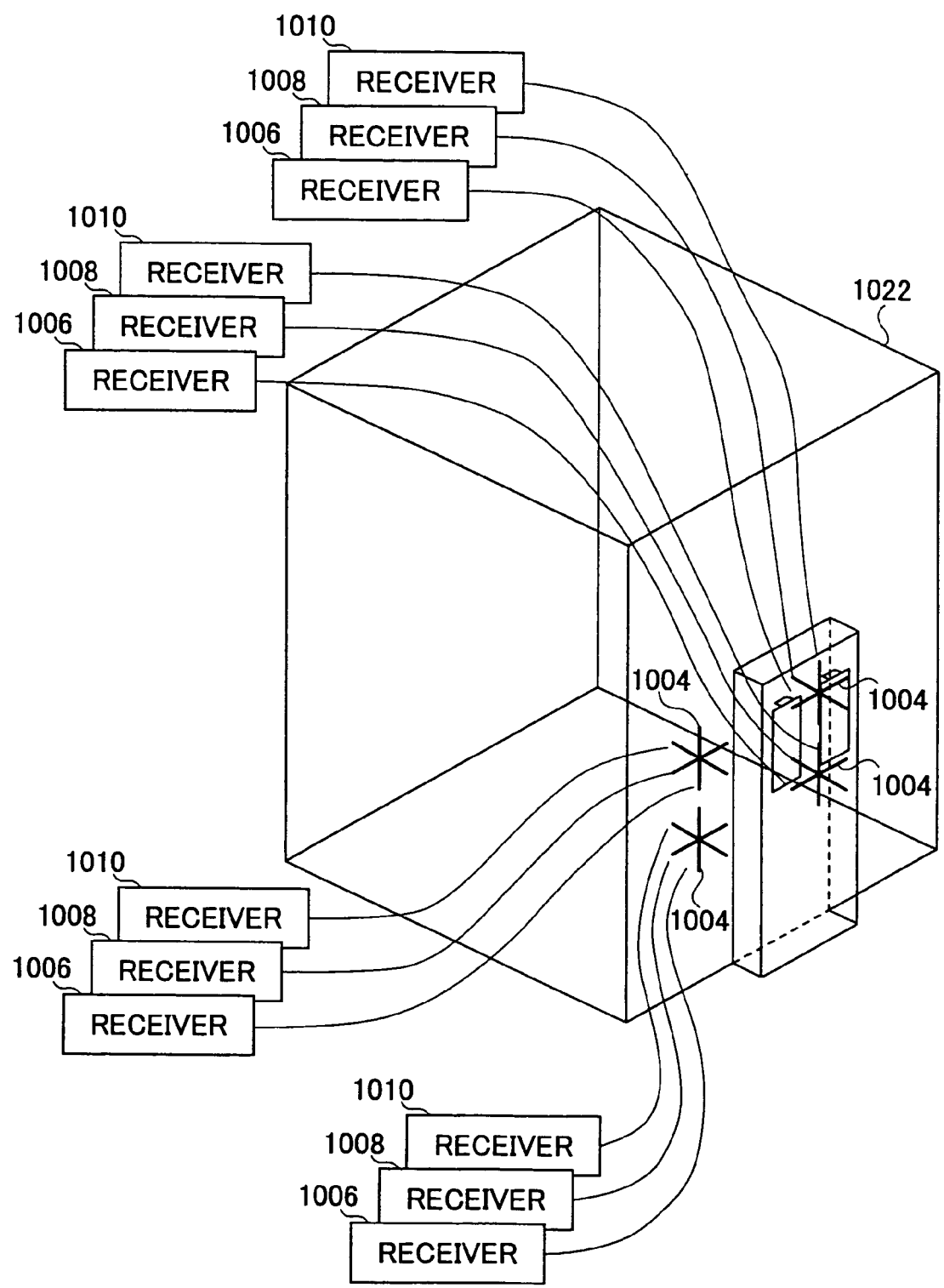
FIG. 12 illustrates a modification of the weighting parameter estimation system in which multiple probes are placed in the pseudobody phantom according to the second embodiment of the invention.

FIG. 12 illustrates a modification of the weight parameter estimation system of the second embodiment. In FIG. 12, four triaxial probes 1004 are placed inside the pseudobody phantom facility 1022. Although the weight parameter determination unit 1012 is not depicted in FIG. 12 for the purpose of simplification, the outputs (the components of the stationary electric field response) of each receiver set connected to the associated probe 1004 are supplied to the weight parameter determination unit 1012 (see FIG. 10). Four sets of electric field responses are obtained in this example. The four sets of electric field responses may be combined, or alternatively, the optimum one may be selected. With this arrangement, the electric field response can be estimated more accurately.

Figure 13:
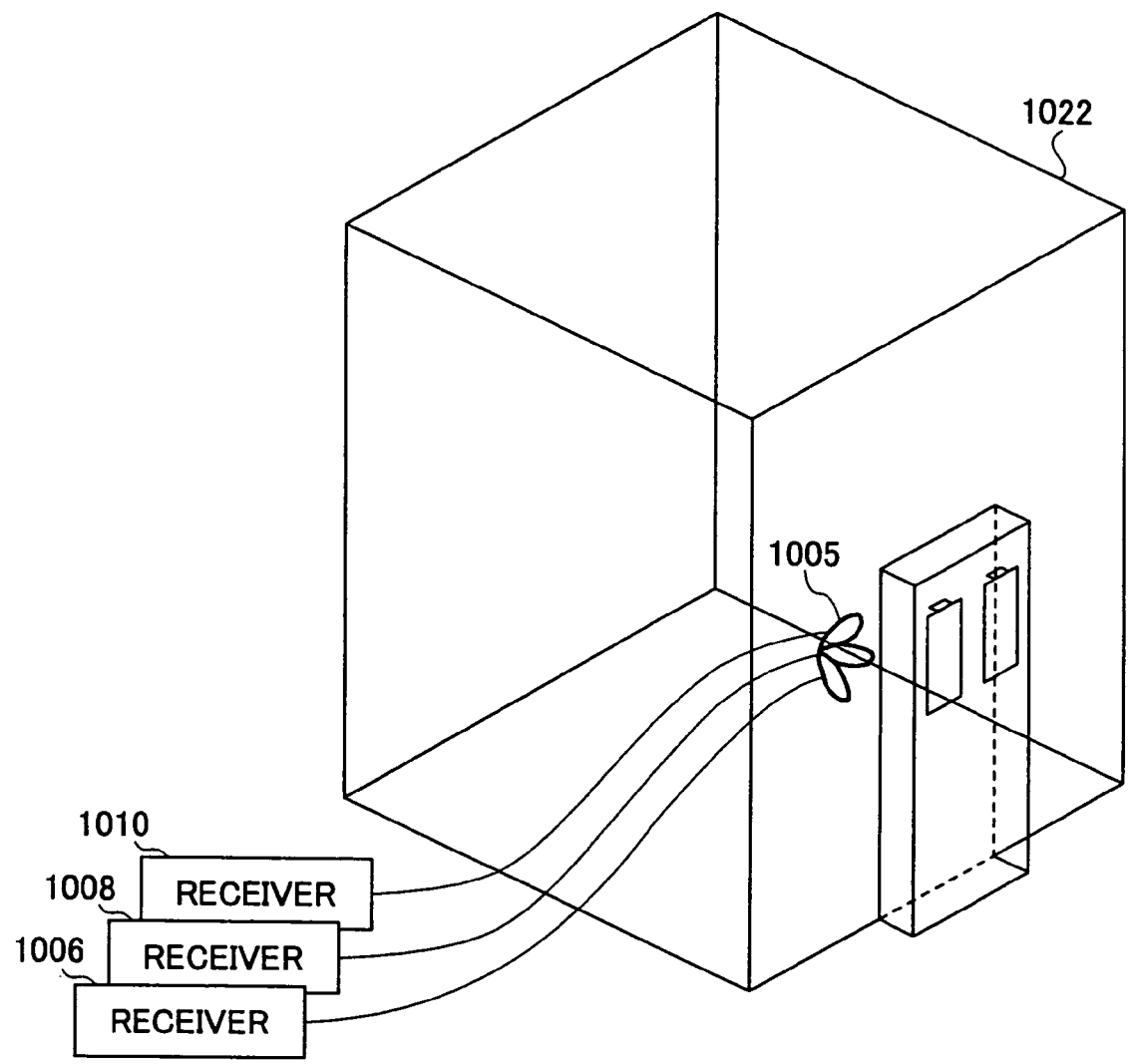
FIG. 13 illustrates another modification of the weighting parameter estimation system in which a loop probe is used in place of the triaxial probe.

FIG. 13 illustrates still another modification of the weight parameter estimation system of the second embodiment. In FIG. 13, a loop probe 1005 is used in place of the triaxial probe 1004.

Although not shown in the drawings, the dimensions of the probe may be decreased. For example, if little consideration is required for one of the three axial components, then the degree of freedom may be decreased and a two-dimensional probe may be used.

This patent application is based on and claims the benefit of the earlier filing dates of Japanese Patent Application Nos. 2003-382887 and 2004-006806 filed Nov. 12, 2003 and Jan. 14, 2004, respectively, the entire contents of which are hereby incorporated by reference.

What is claimed is:

1. A weighting parameter estimation system for estimating a weighting parameter for each of a plurality of antenna elements of a mobile terminal, comprising:
   a pseudobody phantom defining a prohibited space to which an electromagnetic wave should not be directed when the mobile terminal transmits a radio wave;
   a test wave source located in the pseudobody phantom and configured to transmit a test wave randomly polarized over entire ranges in θ and φ directions, the test wave being transmitted from all scanning points inside the pseudobody phantom;
   a plurality of antenna elements provided outside and adjacent to the pseudobody phantom and configured to receive the test wave transmitted from the test wave source; and
   a weighting parameter determination unit configured to estimate a probability density distribution of a time-dependent electric field response from the test wave transmitted from all of the scanning points and determine the weighting parameter for each of the antenna elements based on the probability density distribution such that a power level of all the randomly polarized test wave components transmitted from the pseudobody phantom becomes a minimum.

2. The system of claim 1, wherein the time-dependent electric field response for i-th antenna element being determined according to $$Vi(t)=E_{ix} \cdot n_x(t)+E_{iy} \cdot n_y(t)+E_{iz} \cdot n_z(t)$$

where $n_x(t)$, $n_y(t)$, and $n_z(t)$ are coordinate components of band-limited white noise vector n(t), and $E_{ix}$, $E_{iy}$, and $E_{iz}$ are components of the electric field response for the i-th antenna element.

3. The system of claim 1, further comprising:
   a processor connected to the antenna elements and configured to produce a time-dependent electric field response based on the test wave received at each of the antenna elements,
   wherein the weighting parameter determination unit estimates a probability density distribution of the time-dependent electric field response for each of phase difference and amplitude ratio, and determines the weighting parameter based on the probability density distributions with respect to the phase difference and the amplitude ratio.

4. The system of claim 1, wherein the randomly polarized test wave is polarized in a certain direction instantaneously, but is isotropic if time averaged over time.

5. The system of claim 2, further comprising:
   a processor connected to the antenna elements and configured to produce a time-dependent electric field response based on the test wave received at each of the antenna elements,
   wherein the weighting parameter determination unit estimates a probability density distribution of the time-dependent electric field response for each of phase difference and amplitude ratio, and determines the weighting parameter based on the probability density distributions with respect to the phase difference and the amplitude ratio.

6. The system of claim 2, wherein the randomly polarized test wave is polarized in a certain direction instantaneously, but is isotropic if time averaged over time.

7. A weighting parameter estimation system for estimating a weighting parameter for each of a plurality of antenna elements of a mobile terminal, comprising:
   a pseudobody phantom defining a prohibited space;
   a plurality of antenna elements of the mobile terminal provided outside and adjacent to the pseudobody phantom and configured to transmit a test wave;

a probe located in the pseudobody phantom and configured to receive the test wave;

a weighting parameter determination unit configured to determine the weighting parameter such that the power level of the test wave transmitted from each of the antenna elements of the mobile terminal and received at the probe becomes a minimum, and to configure the mobile terminal to not transmit electromagnetic waves into the prohibited space; and a processor connected to the probe and configured to produce an electric field response for each of the antenna elements based on test wave transmitted from corresponding one of the antenna elements and received at the probe, and then to estimate an electric field time response based on the electric field responses of all the antenna elements, the electric field time response being determined according to $$Vi(t) = E_{ix} \cdot n_x(t) + E_{iy} \cdot n_y(t) + E_{iz} \cdot n_z(t)$$

where $n_x(t)$, $n_y(t)$, and $n_z(t)$ are coordinate components of band-limited white noise vector $n(t)$, and $E_{ix}$, $E_{iy}$, and $E_{iz}$ are components of the electric field response for the i-th antenna element, the weighting parameter of each of the antenna element being determined based on a probability density distribution of the time dependent electric field response.

8. A weighting parameter estimation method for estimating a weighting parameter for each of a plurality of antenna elements of a mobile terminal, comprising the steps of:

defining a chamber which defines a prohibited space in which an electromagnetic wave from the mobile terminal is not directed therein;

placing the mobile terminal with the antenna elements to be estimated outside and adjacent to the chamber;

placing a test wave source inside the chamber;

transmitting a test wave randomly polarized over entire ranges in θ and φ directions from the test wave source;

receiving the test wave at each of the antenna elements from each of scanning points inside the chamber;

updating a scanning point until the test wave has been transmitted from all the scanning points; and determining the weighting parameter for each of the antenna elements of the mobile terminal based upon a probability density distribution of time-dependent electric field responses of all the scanning points such that a power level of the test wave transmitted from chamber and received at the mobile terminal becomes a minimum.

9. The method of claim 8, further comprising the steps of:

estimating the time-dependent electric field response from the test wave over a prescribed time at each of the scanning points, the time-dependent electric field response for i-th antenna element being determined according to $$Vi(t) = E_{ix} \cdot n_x(t) + E_{iy} \cdot n_y(t) + E_{iz} \cdot n_z(t)$$

where $n_x(t)$, $n_y(t)$, and $n_z(t)$ are coordinate components of band-limited white noise vector $n(t)$, and $E_{ix}$, $E_{iy}$, and $E_{iz}$ are components of the electric field response for the i-th antenna element.

10. A weighting parameter estimation method for estimating a weighting parameter for each of a plurality of antenna elements of a mobile terminal, comprising the steps of:

defining a chamber which defines a prohibited space;

placing the mobile terminal with the plurality of antenna elements outside and adjacent to the chamber, wherein the plurality of antenna elements are a test wave source;

placing a probe that receives the test wave inside the chamber;

transmitting the test wave from each of the antenna elements;

receiving the test wave at the probe inside the chamber;

estimating an electric field response for each of the antenna elements;

estimating an electric field time response based on the electric field responses for all of the antenna elements, the electric field time response for i-th antenna element being determined according to $$Vi(t) = E_{ix} \cdot n_x(t) + E_{iy} \cdot n_y(t) + E_{iz} \cdot n_z(t)$$

where $n_x(t)$, $n_y(t)$, and $n_z(t)$ are coordinate components of band-limited white noise vector $n(t)$, and $E_{ix}$, $E_{iy}$, and $E_{iz}$ are components of the electric field response for the i-th antenna element;

estimating the weighting parameter for each of the plurality of antenna elements of the mobile terminal based on a probability density distribution of the electric field time response such that the power level of the test wave received at the probe becomes a minimum.

* * * * *